(12) United States Patent
Handle et al.

(10) Patent No.: US 12,303,959 B2
(45) Date of Patent: May 20, 2025

(54) DEVICE AND METHOD FOR OPEN-LOOP OR CLOSED-LOOP CONTROL OF A MOVEMENT OF A DIE CUSHION OF A DIE CUSHION PRESS

(71) Applicant: Moog GmbH, Boblingen (DE)

(72) Inventors: Werner Handle, Marbach am Neckar (DE); Achim Helbig, Stuttgart (DE)

(73) Assignee: Moog GmbH, Boblingen (DE)

( * ) Notice: Subject to any disclaimer, the term of this patent is extended or adjusted under 35 U.S.C. 154(b) by 675 days.

(21) Appl. No.: 17/627,074

(22) PCT Filed: Jul. 16, 2020

(86) PCT No.: PCT/EP2020/070146
§ 371 (c)(1),
(2) Date: Jan. 13, 2022

(87) PCT Pub. No.: WO2021/009285
PCT Pub. Date: Jan. 21, 2021

(65) Prior Publication Data
US 2022/0250133 A1 Aug. 11, 2022

(30) Foreign Application Priority Data

Jul. 17, 2019 (DE) .......................... 102019119392.3

(51) Int. Cl.
*B21D 24/14* (2006.01)
*G05B 19/18* (2006.01)
*H02P 23/00* (2016.01)

(52) U.S. Cl.
CPC ........... *B21D 24/14* (2013.01); *G05B 19/182* (2013.01); *H02P 23/00* (2013.01); *G05B 2219/45142* (2013.01)

(58) Field of Classification Search
CPC .................. B21D 24/14; G05B 19/182; G05B 2219/45142; H02P 23/00; H02P 23/16;
(Continued)

(56) References Cited

U.S. PATENT DOCUMENTS

2005/0262915 A1* 12/2005 Baba ...................... B21D 24/02
72/351
2006/0090656 A1* 5/2006 Iwashita ................ G05B 19/19
100/43

(Continued)

FOREIGN PATENT DOCUMENTS

CN 101142039 A 3/2008
CN 101146630 A 3/2008
(Continued)

OTHER PUBLICATIONS

"Vance J. VanDoren, Phd., P.E., Noise and Disturbances in process control, Control Engineering, Mar. 15, 2001" (Year: 2001).*
(Continued)

*Primary Examiner* — Santosh R Poudel
(74) *Attorney, Agent, or Firm* — Harter Secrest & Emery LLP

(57) ABSTRACT

In summary, the invention relates to a device and method for open-loop or closed-loop control of a movement of a die cushion of a die cushion press. The device has a control value encoder (11), a speed controller (12), a current controller (13), and a motor control device (14) for providing a nominal current for an electrical drive (15) of a fluid-hydraulic motor pump unit (20) for moving a die cushion of a die cushion press. The control value encoder (11) is provided in order to calculate a setpoint speed based on a die cushion control value command and a die cushion information. The speed controller (12) calculates a setpoint current based on the setpoint speed. The current controller (13) calculates a control signal based on the setpoint current, and
(Continued)

Figure 1:
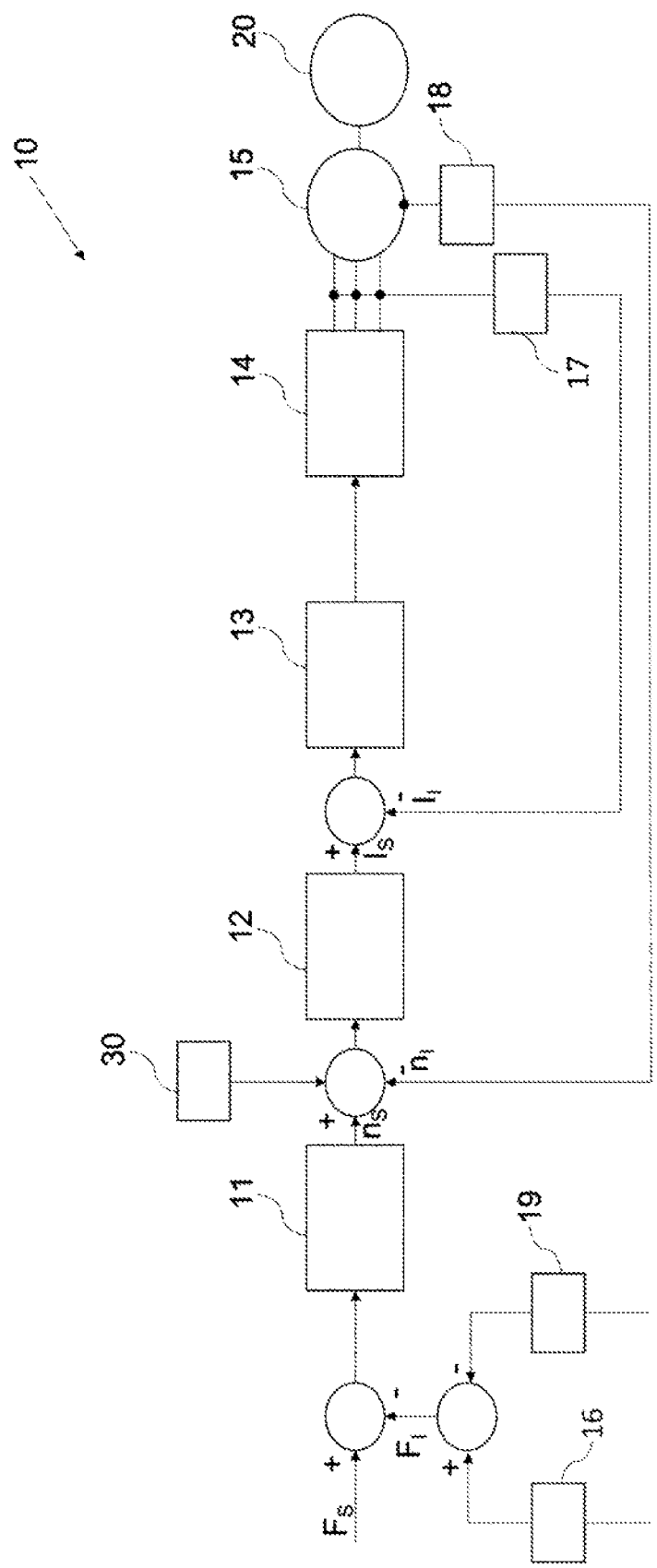

the motor control device (14) calculates the nominal current based on the control current. In this respect, the dynamics of the control of the electrical machine can be improved.

11 Claims, 3 Drawing Sheets

(58) Field of Classification Search
CPC ...... H02P 25/00; H02P 27/08; H02P 23/0004; Y02P 70/10; F04B 17/03; F04B 49/06; G05D 15/01
See application file for complete search history.

(56) References Cited

U.S. PATENT DOCUMENTS

| 2009/0007617 | A1* | 1/2009 | Suzuki | B21D 24/10 |
| | | | | 72/20.1 |
| 2011/0045113 | A1* | 2/2011 | Miyasaka | B21D 24/02 |
| | | | | 425/145 |
| 2014/0084838 | A1 | 3/2014 | Horiguchi | |
| 2014/0285127 | A1* | 9/2014 | Kang | H02P 21/34 |
| | | | | 318/400.11 |
| 2015/0259174 | A1* | 9/2015 | Mustonen | B66B 5/0031 |
| | | | | 187/393 |
| 2017/0025979 | A1* | 1/2017 | Wilson | H02P 6/10 |
| 2020/0166029 | A1* | 5/2020 | Brahmer | B29C 51/46 |

FOREIGN PATENT DOCUMENTS

| CN | 102036765 A | 4/2011 | |
| DE | 3922212 A1 | 1/1991 | |
| DE | 602005000592 T2 | 11/2007 | |
| EP | 1882534 A1 | 1/2008 | |
| EP | 2233282 A2 * | 9/2010 | ............ B30B 1/266 |
| WO | WO-2007099892 A1 * | 9/2007 | ............ B21D 24/10 |
| WO | 2019025478 A1 | 2/2019 | |

OTHER PUBLICATIONS

"Andreas Lauke, Draw cushions for mechanical presses Features, Jul. 12, 2005, The Fabricator" (Year: 2005).*

European Patent Office (EP/US), International Search Report and Written Opinion in PCT/EP2020/070146, dated Sep. 24, 2020, 13 pages.

European Patent Office (EP/US), International Preliminary Report on Patentability in PCT/EP2020/070146, dated Sep. 7, 2021, 39 pages.

* cited by examiner

DEVICE AND METHOD FOR OPEN-LOOP OR CLOSED-LOOP CONTROL OF A MOVEMENT OF A DIE CUSHION OF A DIE CUSHION PRESS

The present invention relates to a device for open-loop or closed-loop control of a movement of a die cushion of a die cushion press, and to a method for open-loop or closed-loop control of a movement of a die cushion of a die cushion press.

PRIOR ART

Die cushion presses are known in the prior art. For example, EP 1 882 534 describes a die cushion press based on a direct pump drive, with which it is possible to recover process energy.

It is characteristic of the die cushion press based on a direct pump drive that the control device controls a torque of the electric motor of the direct pump drive, based on the die cushion pressure command and the detected pressure, such that the die cushion pressure represents a pressure conforming to the die cushion pressure command. In this respect, the die cushion press shown in EP 1 882 534 comprises a pressure regulation which outputs a motor torque as a control value for the electric motor.

In addition to the load pressure at the pump, which is directly proportional to the motor torque, the torque setpoint at the electric motor, however, also requires control value components for the acceleration and deceleration of inertia in the direct pump drive. Moreover, control value components in the motor torque are required which, for example, must compensate for friction and motor losses. Neither acceleration nor loss components are commanded with the described open-loop control of the electric motor. Consequently, the motor torque or motor current to be commanded is subject to very strong changes depending on the occurring motor, pump, and cylinder losses. However, this disadvantageously leads to the situation that the quality and dynamics of the control of the electric motor known in the prior art do not meet the requirement for today's forming processes in which die cushions are used.

Against this background, it is an object of the present invention to at least partially overcome the disadvantages of the prior art, or to improve the prior art.

According to a first aspect of the present invention, this object is achieved according to the invention by a device having the features specified in claim 1.

The invention accordingly achieves a device for open-loop or closed-loop control of a movement of a die cushion of a die cushion press, comprising a control value encoder, a speed controller, a current controller, and a motor control device for providing a nominal current for an electrical drive of a fluid-hydraulic motor pump unit for moving a die cushion of a die cushion press. The control value encoder is provided in order to calculate a setpoint speed based on a die cushion control value command and a die cushion information. The current controller is provided in order to calculate a control signal based on the setpoint current. The motor control device is provided in order to calculate the nominal current based on the control signal.

The nominal current comprises the electrical amperage provided for operating the electrical drive based on the setpoint current.

It has advantageously been recognized that an improvement in the control behavior can be achieved if the specification variable at a motor, or the control value from a position, velocity, or force controller, is a variable proportional to a force or pressure increase. If, in this respect, a motor speed is provided for driving the motor pump unit, a decisive improvement in the dynamic control quality is achieved. The dynamic control quality is thereby a prerequisite in order to be able to follow the compression or force profiles desired during the drawing operation. The acceleration and loss portions in the electrical drive are corrected independently and do not need to be further taken into account.

Advantageously, specifying a motor speed allows a very simple controller switching between position and force regulation of the drawing cylinder. Because the output signal of the controller is the motor speed in the two control modes, the transition can accordingly take place smoothly and without any jerking. This functionality is needed for a die cushion during the transition from the pre-acceleration phase (position-controlled) to the drawing operation (force-controlled). The aforementioned also applies to the transition from the drawing operation (force-controlled) to the return movement (position-controlled).

During the drawing operation (force-controlled), the velocity of the die cushion represents the disturbance variable for the force control. This velocity is measured at the die cushion or is dictated by the velocity of the ram in this phase, and is thus known. If the output signal of the force control is a speed, the known die cushion velocity variable can advantageously be entered in the control circuit as a disturbance variable, and thus ensures a further improvement of the force control.

Further advantageous embodiments of the invention are the subject matter of the dependent claims and of the exemplary embodiments described below.

In an advantageous embodiment of the device according to the first aspect of the present invention, a calculation of the setpoint speed is provided based on a drawing punch information detected by a drawing punch detector.

The drawing punch information comprises, for example, the pressure in the cylinder chamber or the position of the die cushion. The drawing punch detector is, for example, a pressure sensor for detecting the pressure in a first and a second chamber of the hydraulic cylinder. The pressure is measured by the drawing punch detector. An adequate force, in particular the actual force, is determined via the measured pressure and the area of the corresponding chamber of the hydraulic cylinder. The advantageous pressure sensors already installed in the system can advantageously be used.

In an alternative embodiment, the drawing punch detector can be designed as a force-measuring cell which is introduced at the piston rod of the hydraulic cylinder between the piston rod and the workpiece.

In an alternative embodiment, the drawing punch detector comprises acceleration sensors.

In an advantageous embodiment of the device according to the first aspect of the present invention, the control value encoder comprises a position controller, a velocity controller, or a force controller.

Depending on the drawing process, force controllers can advantageously be used to determine a setpoint speed during the drawing operation. During the movement or travel of the tool and the cylinder toward the workpiece and in the opposite direction, position controllers and velocity controllers, for example, can be used to determine a setpoint speed.

In a further advantageous embodiment of the device according to the first aspect of the present invention, the device comprises a current detector for detecting the control signals of the electrical drive. The current controller uses a setpoint current which is a difference between the setpoint current and the feedback of the nominal current of the electrical drive as detected by the current detector.

The electrical drive comprises three phases, and the motor torque results from the electric currents of the three phases. The electric currents in the three phases of the electrical drive are measured by means of the current detector. In an alternative embodiment, only the electric currents need to be measured in two phases of the electrical drive, and the current of the third phase can be determined.

This has the advantage that, to determine the current, current detectors already existing at the electrical drive can be used to determine the current. A feedback of the actual current of the electrical drive helps to derive the actual speed, and thus to more dynamically design the closed-loop control or the system to be regulated. In addition, the control bandwidth in the system is increased.

In a further advantageous embodiment of the device according to the first aspect of the present invention, the device comprises a speed sensor for detecting an instantaneous speed of the electrical drive. The speed controller uses a setpoint speed which is a difference between the setpoint speed and the feedback of the instantaneous speed of the electrical drive detected by the speed sensor.

This has the advantage that already existing sensors at the electrical drive can be used, the information the actual speed of the motor.

In a further advantageous embodiment of the device according to the first aspect of the present invention, the speed controller uses a setpoint speed which comprises a disturbance variable.

This has the advantage that, for example, the velocity can be entered as a disturbance variable during the deep drawing process in power operating mode. The quality of the force control is thus improved. During the movement of the hydraulic cylinder, for example in the direction of the workpiece, in which the force, in addition to the movement, is advantageously regulated by the force controller, a speed can advantageously be provided to the motor pump unit so that it corresponds to the speed of the tool. Thus, with already previously provided information about the velocity, overshoots in the system, for example pressure maxima or pressure minima of the motor pump unit, can be avoided, and the system acts more dynamically and the control value encoder is relieved.

In a further advantageous embodiment of the device according to the first aspect of the present invention, the setpoint speed of the control value encoder is proportional to the increase in force or pressure within the die cushion press.

This has the advantage that, independently of occurring disturbance variables at the die cushion press, the value of which is not known—for example friction in the cylinder, friction in the motor pump unit, losses in the electrical drive—a speed is specified via a speed controller, and disturbance variables and thus losses are corrected in this respect. For example, stick-slip behavior of the motor pump unit above the predetermined speed can be reduced. The speed controller provides a current for the predetermined speed, from which the torque for the motor is generated.

The above embodiments and developments can be arbitrarily combined with one another insofar as is reasonable. Further possible embodiments, developments, and implementations of the invention also include combinations, not explicitly mentioned, of features of the invention described above or below with respect to the exemplary embodiments. In particular, the person skilled in the art will thereby also add individual aspects as an improvement or addition to the respective basic form of the present invention.

According to a second aspect of the present invention, the invention further provides a method for open-loop or closed-loop control of a movement of a die cushion of a die cushion press having the features specified in claim 8.

The invention accordingly achieves a method for open-loop or closed-loop control of a movement of a die cushion of a die cushion press, comprising the steps of:

Receiving a die cushion control value command and a die cushion information via the control value encoder; calculation of a setpoint speed by the control value encoder based on the received die cushion control value command and the die cushion information; calculation of a setpoint current by the speed controller based on the calculated setpoint speed; calculation of a control signal by the current controller based on the calculated setpoint current; and calculation of a nominal current by a motor control device based on the calculated control signal for providing a nominal current for an electrical drive of a fluid-hydraulic motor pump unit for moving a die cushion of a die cushion press.

In an advantageous embodiment of the method according to the second aspect of the present invention, the setpoint speed is calculated based on a drawing punch information. The drawing punch information is detected by a drawing punch detector.

In a further advantageous embodiment of the method according to the second aspect of the present invention, the current controller uses a setpoint current. The setpoint current is a difference between the setpoint current and the feedback of the nominal current of the electrical drive as detected by a current detector.

In a further advantageous embodiment of the method according to the second aspect of the present invention, the setpoint speed is calculated based on a drawing punch information. The drawing punch information is detected by a drawing punch detector.

In a further advantageous embodiment of the method according to the second aspect of the present invention, the current controller uses a setpoint current that is a difference between the setpoint current and the feedback of the nominal current of the electrical drive as detected by a current detector.

In a further advantageous embodiment of the method according to the second aspect of the present invention, the speed controller uses a setpoint speed. The setpoint speed is a difference between the setpoint speed and the feedback of the instantaneous speed of the electrical drive as detected by a speed sensor.

In a further advantageous embodiment of the method according to the second aspect of the present invention, the speed controller uses a setpoint speed which comprises a disturbance variable.

According to a third aspect of the present invention, the invention further achieves a die cushion press containing a device according to claims 1 to 7.

The present invention is explained in more detail below using the exemplary embodiments specified in schematic Figures of the drawings.

Figure 2:
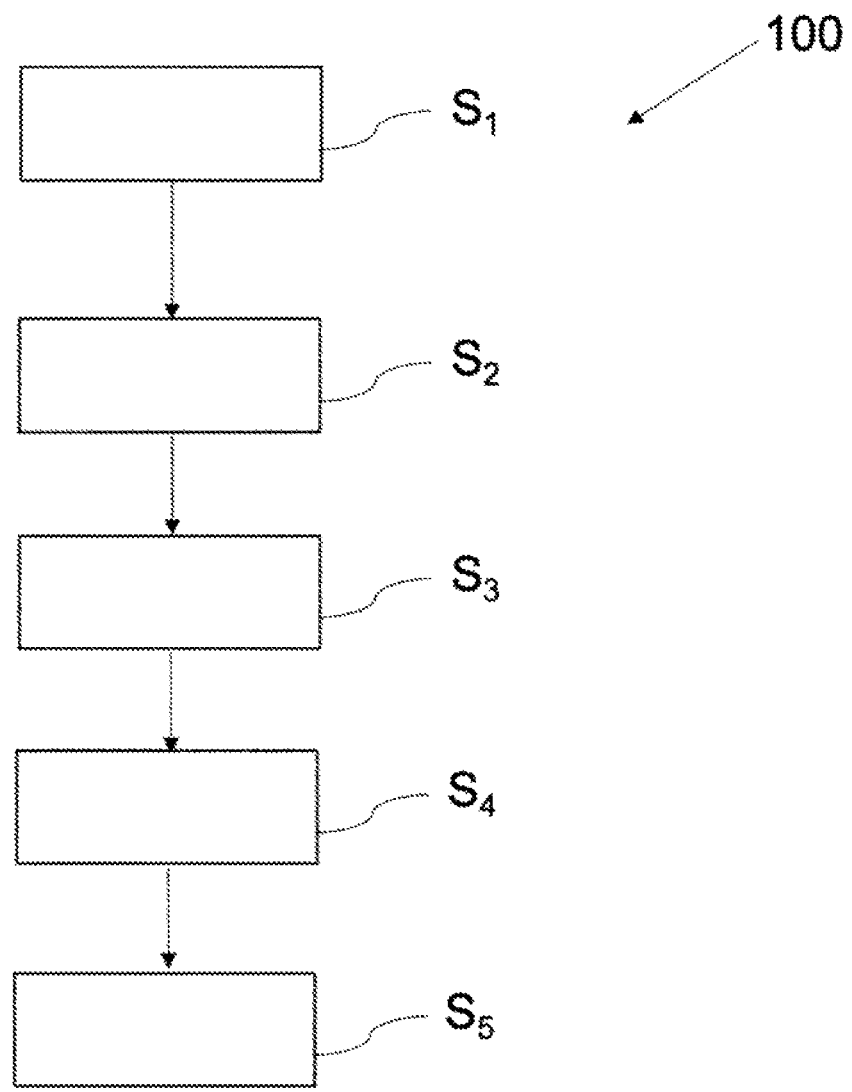

Shown are:

FIG. 1 a schematic block diagram illustrating an exemplary embodiment of a device according to the invention for open-loop or closed-loop control of a movement of a die cushion of a die cushion press;

FIG. 2 a schematic flow chart illustrating a possible exemplary embodiment of a method according to the invention for open-loop or closed-loop control of a movement of a die cushion of a die cushion press;

FIG. 3a-3d a diagram for explaining the force control in a deep drawing cycle, including disturbance variable entry, in a possible embodiment of a device according to the invention for open-loop or closed-loop control of a movement of a die cushion of a die cushion press.

The accompanying drawings are intended to impart a further understanding of embodiments of the invention. They illustrate embodiments and, in conjunction with the description, serve to explain principles and concepts of the invention. Other embodiments and many of the aforementioned advantages result with regard to the drawings. The elements of the drawings are not necessarily shown to scale relative to one another.

In Figures of the drawing, identical, functionally identical, and identically acting elements, features, and components are respectively provided with the same reference signs, insofar as is not stated otherwise.

FIG. 1 shows a block diagram illustrating an exemplary embodiment of a device according to the invention for open-loop or closed-loop control of a movement of a die cushion of a die cushion press.

Shown in FIG. 1 is the device 10 comprising a control circuit for closed-loop control of a die cushion press, with a cascade circuit of a control value encoder 11, a speed controller 12, a current controller 13, and a motor control device 14. The control value encoder 11 can be designed as a position controller, velocity controller, or as a force controller.

In an advantageous embodiment, the control value encoder 11, for example a force controller, receives as a control variable a difference from a die cushion information, for example the setpoint force $F_S$ and an actual force $F_I$, in the power operating mode or the actual deep drawing process of the die cushion press. The setpoint force $F_S$ is the reference variable (setpoint value). The actual force $F_I$ comprises a drawing punch information and results from the difference of the forces corresponding to the pressure in the two chambers of the hydraulic cylinder. The force results from the measured pressure and the area of the corresponding chamber of the hydraulic cylinder. The actual force $F_I$ results from the difference because both chambers of the hydraulic cylinder have a reciprocal effect with respect to one another. The pressure in the respective chamber is determined via a drawing punch detector 16 and 19.

The drawing punch detector 16, 19 is a pressure sensor, for example. The pressure sensors provided in the hydraulic cylinder can be used as the pressure sensor, for example.

In an alternative embodiment, the drawing punch detector 16, 19 is designed as a force-measuring cell.

In a further alternative embodiment, the drawing punch detector 16, 19 is designed as a position sensor, for example an acceleration sensor.

The control variable provided to the control value encoder 11 results from the difference of the setpoint force $F_S$ and the actual force $F_I$. The control value encoder 11 provides a setpoint speed $n_S$ to the speed controller 12. The reference variable provided to the speed controller 12 is a difference from the setpoint speed $n_S$ provided by the control value encoder 11, the instantaneous speed (actual speed) $n_I$, and the disturbance variable 30. As a result, the speed controller 12 provides a setpoint current $I_S$ to the current controller 13.

The reference variable provided to the current controller 13 is a difference from the setpoint current $I_S$ provided by the speed controller 12 and the actual current $I_S$. Based on the reference variable provided by the speed controller 12, the current controller 13 provides a control signal for controlling the motor control device 14.

The control signal may comprise a pulse width-modulated voltage, for example. The motor control device 14, for example a frequency converter, converts the pulse width-modulated voltage into a nominal current for operating the electrical machine 15 to drive the motor pump unit 20. The nominal current is hereby the electrical amperage received by the electrical drive 15 during operation of the motor pump unit 20 and die cushion press, based on the control signal provided to the motor control device 14. The electrical drive 15 is a three-phase AC motor, for example. The motor pump unit 20 provides the hydraulic energy for operating the die cushion press.

A current detector 17 is connected to the output of motor control device 14. The current detector 17 determines the electrical amperage in the three phases of the electrical drive 15, and provides the determined electrical amperage via feedback to the current controller 13 in order to calculate a control signal. The value of the electrical amperage at the three phases of the electrical drive 15 is determined via the current detector 17. For this purpose, current detectors 17 present at the electrical drive 15 can be used to determine the actual current $I_S$ and to return it to the current controller 13 for further processing. This simplifies deriving the actual speed of the electrical drive 15, and thus dynamically configuring the closed-loop control or the system to be controlled. In addition, the control bandwidth in the system is increased.

In an alternative embodiment, the control signal for the electrical drive can be provided by an open-loop control via a controlled current at the current controller 13.

A speed sensor 18 is connected to the electric drive 15 of the motor pump unit 20. The speed sensor 18 determines the instantaneous speed $n_I$ of the electrical drive 15, and provides the determined instantaneous speed $n_I$ via feedback to the speed controller 12 in order to calculate a setpoint current $I_S$. Conventional speed sensors 12 that, for example are already provided at the electrical drive 15 can be used to determine the speed of the electrical drive 15. An additional closed-loop control of the speed can advantageously increase the dynamics of the current regulation in the inner loop of the overall control of the electrical drive 15.

In an alternative embodiment, the electrical drive 15 can be controlled via a controlled rotary field by means of the speed sensor already provided at the electrical drive 15.

The disturbance variable 30 is taken into account in order to calculate the control variable for the rotary controller 12. The velocity is entered as disturbance variable 30. In particular, during the drawing operation (the velocity of the die cushion can be activated as a disturbance variable for the force control. This velocity is measured at the die cushion or is dictated by the velocity of the ram in this phase, and is thus known. If the output signal of the force control is a speed, the known die cushion velocity variable can advantageously be entered in the control circuit as a disturbance variable, and thus ensures a further improvement of the force control.

FIG. 2 shows a schematic flow chart illustrating a possible exemplary embodiment of a method according to the invention for open-loop or closed-loop control of a movement of a die cushion of a die cushion press.

In the shown exemplary embodiment, the method comprises a plurality of steps. In a first step S1, a die cushion control value command and a die cushion information are received by the control value encoder 11. The die cushion information comprises the setpoint force $F_S$, for example.

In a further step S2, a setpoint speed ns is calculated by the control value encoder 11 based on the received die cushion control value command and the die cushion information. The setpoint speed $n_S$ is calculated from the difference of the setpoint force $F_S$ and the actual force $F_I$. The actual force $F_I$ is the difference from the products of the current pressure in the chambers of the hydraulic cylinder and the area of the hydraulic cylinders. The pressure in the chambers can be determined via the drawing punch detectors 16, 19, for example pressure sensors.

In one embodiment, the setpoint speed $n_S$ comprises a difference from the instantaneous speed $n_I$ fed back by the drive machine 15 and an entered disturbance variable, for example the velocity of the die cushion. The instantaneous speed $n_I$ of the electrical drive machine 15 is determined by a speed sensor 18.

In a further step S3, a setpoint current $I_S$ is calculated by the speed controller 12 based on the calculated setpoint speed $n_S$. In one possible embodiment, the setpoint current $I_S$ comprises the difference between the setpoint current $I_S$ provided by the control value encoder 12 and the actual current $I_I$ provided by the motor control device 14 to the electrical drive 15. The actual current $I_I$ is provided by a feedback. The electrical amperage of the actual current $I_I$ is determined by a current detector, for example.

In a further step S4, a control signal is calculated by the current controller 13 based on the setpoint current $I_S$ provided by the speed controller 12. The control signal may comprise a pulse width-modulated voltage, for example. In a further step S5, the motor control device 14, for example a frequency converter, converts the pulse width-modulated voltage into a nominal current to operate the electrical machine 15 for driving the fluid-hydraulic motor pump unit 20 to move a die cushion of a die cushion press.

FIGS. 3a to 3d show a diagram for explaining the force control in a deep drawing cycle, including disturbance variable entry, in a possible embodiment of a device according to the invention for open-loop or closed-loop control of a movement of a die cushion of a die cushion press.

A deep drawing operation is illustrated in FIGS. 3a to 3d, wherein the pre-acceleration of the die cushion has been activated. The measurement was performed with a simulation tool in order to prevent any damages caused by errors during commissioning. The test shown in FIGS. 3a to 3d shows a stable force control for the entire deep drawing stroke. The force build-up takes place without significant overshooting.

Figure 3A:
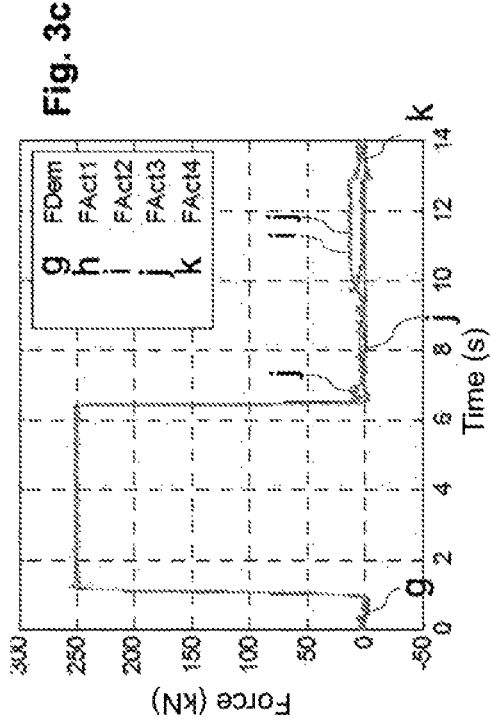

The rams and cylinder positions 1 to 4 of the die cushion are illustrated in FIG. 3a. The curves lie one behind another, and the cylinders move in parallel. The die cushion is actively pre-accelerated in the time range from 0 s to 1 s. At the point in time of 1 s, the ram strikes the die cushion and displaces it. The forming process takes place in the time range from 1 s to 7 s. At the point in time of 7 s, the ram moves upward while the die cushion remains in the pressing position. The formed part can be removed (see time range of 7 s to 10 s). Over the period from 10 s to 13 s, the die cushion cylinders return to the initial position. The new form part can be inserted.

Figure 3B:
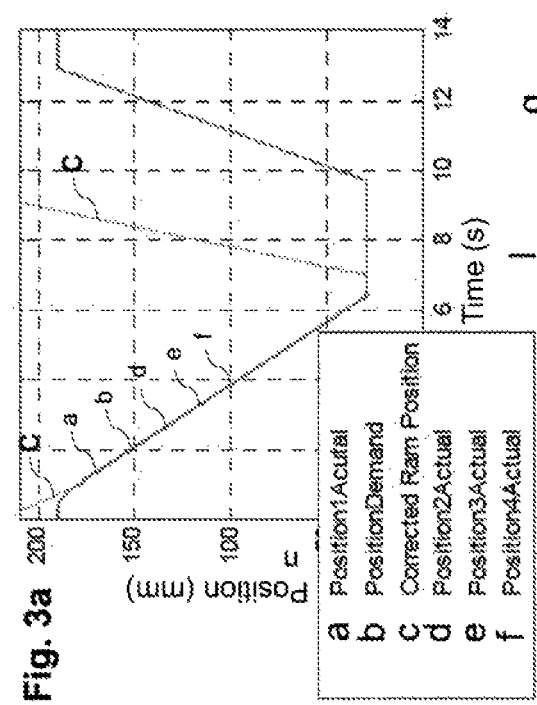

The velocity of the die cushion cylinders 1-4 and the velocity of the ram are shown in FIG. 3b. In the time range from 0 s to 1 s, the drawing cylinders are pre-accelerated. Furthermore, a relative velocity prevails between the ram and the die cushion cylinder. At the point in time of 1 s, the ram and die cushion come into contact. As of the time range from 1 s to 7 s, the die cushion is displaced by the ram; the velocity of the ram and die cushion are therefore identical.

Figure 3C:
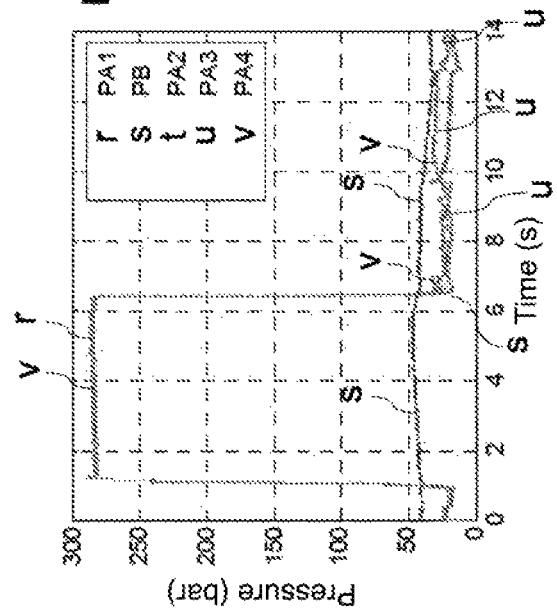

FIG. 3c shows the force at the drawing cylinders, as calculated from the chamber pressures. This force represents the controlled variable during the drawing process in the time range from 1 s to 7 s. FIG. 3c shows the control quality of the force control given a constant setpoint value of 250 kN per cylinder. The actual force thereby almost ideally follows the setpoint profile, even though the die cushion cylinder is moving (see FIG. 3b). This force control quality can only be achieved due to the force control by means of the speed specification according to the present invention, because the entry of the control disturbance variable (velocity of the cylinder) can only be realized in this way. Moreover, occurring hydraulic mechanical losses, for example friction, are corrected by the speed specification of the force controller.

Figure 3D:
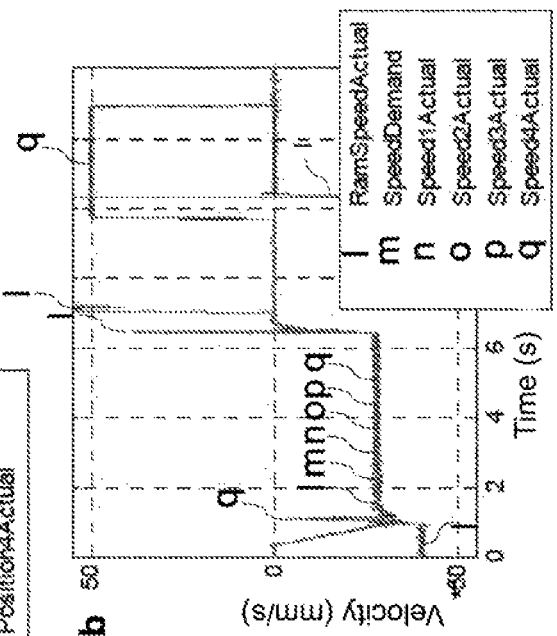

FIG. 3d shows the pressures on the A side and B side of the draw cushion cylinders. The respective output force of the draw cylinders can be calculated from the respective pressures over the area of the draw cylinder (see FIG. 3c).

In summary, the invention relates to a device and method for open-loop or closed-loop control of a movement of a die cushion of a die cushion press. The device has a control value encoder (11), a speed controller (12), a current controller (13), and a motor control device (14) for providing a nominal current for an electrical drive (15) of a fluid-hydraulic motor pump unit (20) for moving a die cushion of a die cushion press. The control value encoder (11) is provided in order to calculate a setpoint speed based on a die cushion control value command and a die cushion information. The speed controller (12) calculates a setpoint current based on the setpoint speed. The current controller (13) calculates a control signal based on the setpoint current, and the motor control device (14) calculates the nominal current based on the control current.

In this respect, the dynamics of the control of the electrical machine can be improved.

LIST OF REFERENCE SIGNS

10 Device
11 Control value encoder
12 Speed controller
13 Current controller
14 Motor control device
15 Electrical drive
16 Drawing punch detector
17 Current detector
18 Speed sensor
19 Drawing punch detector
20 Motor pump unit
30 Disturbance variable
100 Method
S1-S4 Method steps

The invention claimed is:

1. A device for open-loop or closed-loop control of a movement of a die cushion of a die cushion press, comprising:
    a control value encoder;
    a speed controller;
    a current controller; and
    a motor control device for providing a nominal current for an electrical drive of a fluid-hydraulic motor pump unit for moving a die cushion of a die cushion press;

wherein the control value encoder is provided in order to calculate a target setpoint speed based on a die cushion control value command and a die cushion information;

wherein the speed controller is provided in order to calculate a setpoint current based on the target setpoint speed;

wherein the speed controller uses a setpoint speed which comprises a disturbance variable;

wherein a velocity of the die cushion of the die cushion press is connected as the disturbance variable;

wherein the current controller is provided in order to calculate a control signal based on the setpoint current; and wherein the motor control device is provided in order to calculate the nominal current based on the control signal.

2. The device according to claim 1, wherein the calculation of the target setpoint speed is provided based on a drawing punch information detected by a drawing punch detector.

3. The device according to claim 1, wherein the control value encoder comprises a position controller, a velocity controller, or a force controller.

4. The device according to claim 1, further comprising a current detector for detecting the nominal current of the electrical drive, wherein the current controller uses a second setpoint current which is a difference from the setpoint current and the feedback of the nominal current of the electrical drive as detected by the current detector.

5. The device according to claim 1, further comprising a speed sensor for detecting an instantaneous speed of the electrical drive, wherein the speed controller uses the setpoint speed which is a difference from the target setpoint speed and the feedback of the instantaneous speed of the electrical drive as detected by the speed sensor.

6. The device according to claim 1, wherein the target setpoint speed of the control value encoder is proportional to the increase in force or pressure within the die cushion press.

7. A die cushion press containing a device according to claim 1.

8. A method for open-loop or closed-loop control of a movement of a die cushion of a die cushion press, comprising the steps of:

receiving a die cushion control value command and a die cushion information via a control value encoder;

calculation of a target setpoint speed by the control value encoder, based on the received die cushion control value command and the die cushion information;

calculation of a setpoint current by a speed controller, based on the calculated target setpoint speed and a setpoint speed which comprises a velocity of the die cushion of the die cushion press connected as a disturbance variable;

calculation of a control signal by the current controller, based on the calculated setpoint current; and calculation of a nominal current by a motor control device, based on the calculated control signal;

in order to provide a nominal current for an electrical drive of a fluid-hydraulic motor pump unit for moving a die cushion of a die cushion press.

9. The method according to claim 8, wherein the target setpoint speed is calculated based on a drawing punch information detected by a drawing punch detector.

10. The method according to claim 8, wherein the current controller uses a second setpoint current which is a difference from the setpoint current and the feedback of the nominal current of the electrical drive as detected by a current detector.

11. The method according to claim 8, wherein the speed controller uses the setpoint speed, which is a difference from the target setpoint speed and the feedback of an instantaneous speed of the electrical drive as detected by a speed sensor.

* * * * *